US006375879B1

(12) United States Patent
Horiuchi

(10) Patent No.: US 6,375,879 B1
(45) Date of Patent: Apr. 23, 2002

(54) METHOD FOR MANUFACTURING A CONTACT KEY SWITCH

(75) Inventor: Wataru Horiuchi, Tokyo (JP)

(73) Assignee: Polymatech Co., Ltd. (JP)

( * ) Notice: Subject to any disclaimer, the term of this patent is extended or adjusted under 35 U.S.C. 154(b) by 58 days.

(21) Appl. No.: 09/633,333

(22) Filed: Aug. 7, 2000

Related U.S. Application Data

(62) Division of application No. 09/253,404, filed on Feb. 19, 1999, now Pat. No. 6,180,900.

(51) Int. Cl.[7] ........................ B29C 39/10; B29C 39/12; B29C 43/18; B29C 43/20; B29C 70/40

(52) U.S. Cl. ....................... 264/105; 264/153; 264/257; 264/258

(58) Field of Search ................................ 264/104, 105, 264/153, 257, 258, 134, 135, 136, 177, 160, 163, 319; 200/262, 512, 267

(56) References Cited

U.S. PATENT DOCUMENTS 4,264,386 A * 4/1981 Sears, Jr. et al. ........... 264/257
4,442,055 A * 4/1984 Oelsh et al. ................ 264/105
4,532,099 A * 7/1985 Kaji ........................... 264/104
4,735,753 A * 4/1988 Ackermann ................. 264/257
4,790,968 A * 12/1988 Ohkawa et al. ............. 264/104
4,830,809 A * 5/1989 Liebl .......................... 264/257
5,270,507 A * 12/1993 Nakamura et al. .......... 200/511
5,399,821 A * 3/1995 Inagaki et al. .............. 200/341
5,557,079 A * 9/1996 Jackson et al. ............. 200/305
5,635,252 A * 6/1997 Fraser, Jr. et al. .......... 264/258
6,013,213 A * 1/2000 Lewit et al. ................ 264/258

* cited by examiner

*Primary Examiner*—Angela Ortiz
(74) *Attorney, Agent, or Firm*—McGlew and Tuttle, P.C.

(57) ABSTRACT

A contact key switch formed with two conductive layers molded together on opposite sides of an elastic layer to form a contact sheet. A contact portion is removed from the contact sheet and molded with a main body to form the contact key switch.

20 Claims, 4 Drawing Sheets

METHOD FOR MANUFACTURING A CONTACT KEY SWITCH

This is a divisional of application Ser. No. 09/253,404 filed Feb. 19, 1999, now U.S. Pat. No. 6,180,900 and the entire disclosure of this prior application is considered to be part of the disclosure of the accompanying application and is hereby incorporated by reference therein.

FIELD OF THE INVENTION

The present invention relates to a contact key switch used as an input key for an electronic instruments such as a telephone, a calculator, and an AV instrument, or a automobile le such as a power window and a remote controlled door mirror, and a method for its manufacture.

BACKGROUND OF THE INVENTION

As a rule, the rubber-like elastic key pad of the main body of a contact key switch is manufactured using as a material an insulating rubber-like elastic body represented by materials such as a natural rubber, synthetic rubber, or thermoplastic elastic body, by processing with various methods such as compression molding, injection molding, etc. Among the rubber-like elastic body, silicon rubber is frequently used for having many characteristics, such as electric insulation, low temperature resistant, heat proof, chemical resistance, precision molding ability, and resilience elasticity, necessary for a contact key switch.

A contact portion is exemplified by those molded integrally with an electroconductive chip on the contact portion of the key pad in a given shape by mixing carbon black and metal powder in a rubberlike elastic material, those formed by preparing a layer of electroconductive ink on the contact portion by screen printing or pad printing after previous making the main body of the contact key switch, and those molded integrally after preparing the electroconductive chip by punching a layering body, that is made by layering a metal layer plated a metal plate on a rubber layer, in a given shape.

SUMMARY AND OBJECTS OF THE INVENTION

However, said contact portion has been made by mixing carbon black and metal powder, which are electroconductive media, in an elastic material or ink. Therefore, compounding a large quantity of an electroconductive medium yields some 10 ohms or higher of a contact resistance, not allowing a use suitable for the low contact resistance of some ohms or lower.

In addition, the contact portion of a contact switch made by plating of a metal on a rubber layer is, as described in Japanese Patent Publication 06(1994)-93335 and Japanese Patent Laid-Open 08(1996)276435, is made of a metal, and suitable for the use for a low resistance. However, silicon as the material of the keypad is normally difficult to adhere to a metal as known from the use as a release agent. Therefore, adhesive and adhering procedure should be used by selection to make adhesion of both materials possible. On the other hand, both sides of the electroconductive chip have consisted of a metal layer and an insulating rubber layer. Therefore, the metal layer should be contact with the-mold surface at insertion of the mold in molding step. This step makes the efficiency of manufacture worse and cost higher.

To solve the aforementioned problem, the present invention provides a contact key switch usable for a low resistance by making the surface of contact portion of contact switch with electroconductive woven fabric or electroconductive nonwoven.

The material of the rubber part of the main body of the contact switch and layered body is, as used as the contact switch, not specially restricted if having a high resilience elasticity, however, preferably an insulating rubber-like elastic body represented by a synthetic rubber selected from at least any one of natural rubber, ethylenepropylene rubber, silicon rubber, butadiene rubber or a thermoplastic elastic body selected from at least any one of styrene, esters, olefins, urethanes, and vinylated compounds.

On the other hand, the constituent of the electroconductive woven fabric or electroconductive nonwoven fabric is not specially restricted if at least one of warp fibers or woof fibers is consisted of electroconductive fibers.

Further, the present invention provides a contact key switch excellent in characteristics such as !ow temperature resistant, heat-proof, chemical resistance, precision molding ability, and resilience elasticity, by using silicon rubber for a rubber-like elastic body.

Furthermore, the present invention provides a contact key switch usable for a low resistance by using material selected from carbon fiber and metal fiber for an electroconductive woven fabric or an electroconductive nonwoven fabric.

According to the present invention, carbon fibers composing the electroconductive woven fabric or the electroconductive nonwoven fabric is selected from fiber constitution of number of wales of 10 to 30 per 25 mm and filament number of 1000 to 6000 in the electroconductive woven fabric and carbon mass rate of 0.03 to 2.5 g per $Cm^3$ in the electroconductive nonwoven fabric. A smaller number of fiber constitution than that of respective number ranges increases surface resistance by invasion of unvulcanized rubber, in the surface of layered contact portion due to large opening portion of the electroconductive woven fabric or the electroconductive nonwoven fabric. A larger number of fiber constitution than that of respective number ranges easily allows surface dissociation by lowered holding performance of vulcanized rubber and fibers caused by no invasion of unvulcanized rubber between fibers due to small opening portion of the electroconductive woven fabric or the electroconductive nonwoven fabric.

The method for manufacture of carbon fibers is not specially restricted, and can be selected from fibers prepared by carbonizing through heat treatment of fibers made by spinning of an organic fibers such as rayon and polyacrylonitrile and purified petroleum pitch in an inert gas atmosphere.

The material of metal fiber is not specially restricted, and may be fibers-such as gold, gold alloy, silver, copper, copper alloy, iron, nickel, brass, and when corrosible material is used, those of which the entire surfaces has been plated with a material, such as gold or gold alloy, not easily corrosible.

The layered contact portion is manufactured by penetrating unvulcanized rubber into the opening portion of the electroconductive woven fabric or the electroconductive nonwoven fabric to harden and make a layered body, and by punching the layered body in a given shape.

The layered body made of the rubber layer and the electroconductive woven fabric or the electroconductive nonwoven fabric, of the present invention, is manufactured by layering the electroconductive woven fabric or the electroconductive nonwoven fabric on the unvulcanized rubber to subject to compression molding.

The layered body made of the rubber layer and the electroconductive woven fabric or the electroconductive nonwoven fabric, of the present invention, is manufactured by layering evenly the unvulcanized rubber on the electroconductive woven fabric or the electroconductive nonwoven fabric using a roll or a blade, if necessary, by further layering the electroconductive woven fabric or the electroconductive nonwoven fabric on the unvulcanized rubber, and by using a hardening furnace with far infrared rays, near-infrared rays, or heat air.

According to aforementioned method, the unvulcanized rubber is hardened after penetrating into the opening portion of the electroconductive woven fabric or the electroconductive nonwoven fabric to allow easy formation of the layered contact portion. Thus, selection and use of an adhesive and adhesion process is not necessary.

The condition of the unvulcanized rubber of the present invention is not restricted to either a liquid form or a solid form. However, when the unvulcanized rubber is evenly layered on the electroconductive woven fabric or the electroconductive nonwoven fabric by using a roll or a blade, the liquid form is preferable for easy penetration into the opening portion of the electroconductive woven fabric or the electroconductive nonwoven fabric.

In the use of silicon rubber for the rubber layer, if silane coupling agent is applied to the electroconductive woven fabric or the electroconductive nonwoven fabric, if necessary, the holding performance of the electroconductive woven fabric or the electroconductive nonwoven fabric is increased. A silane coupling agent is used broadly in order to improve reactivity with the material which is hard to stick to an end usually. For example, there are vinyl-trimetoxylane, amino-silane, and these are appropriately selected according to the material. In addition, the rubber layer is not restricted to insulating or electroconductive rubber layer. However, if electroconductive rubber is used, the contact resistance of the contact portion shows a tendency to fall to a lower value. The layered contact portion is formed by punching the layered body in a given shape. The layered contact portion is engaged to the contact part of the mold of the rubber-like elastic key pad to fit the surface of the electroconductive woven fabric or the electroconductive nonwoven fabric to the mold, followed by integrated molding by inserting the rubber-like-elastic material in the mold.

The layered body made of the rubber layer and the electroconductive woven fabric or the electroconductive nonwoven fabric, of the present invention, is manufactured by putting the electroconductive woven fabric or the electroconductive nonwoven fabric on the mold for injection molding, extruding the thermoplastic elastic body to the mold, and seizing the melted thermoplastic elastic body to the electroconductive woven fabric or the electroconductive nonwoven fabric or penetrating to the opening portion of the electroconductive woven fabric or the electroconductive nonwoven fabric.

Layering the electroconductive woven fabric or the electroconductive nonwoven fabric on both sides of the rubber layer causes both sides to have electroconductivity in the layered contact portion. Therefore, a jig or an apparatus for identifying the side of the layered contact portion is not necessary for insertion of the layered contact portion in the contact part of the mold to allow efficient manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
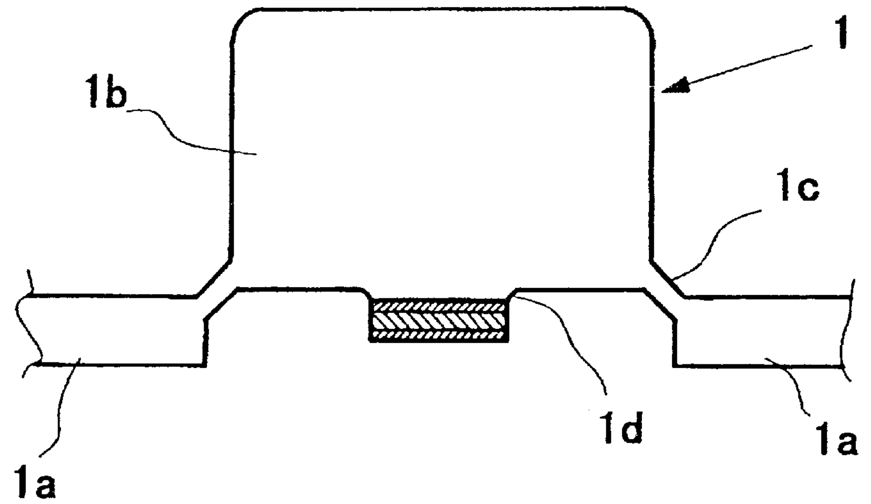
FIG. 1 is a sectional view of a contact key switch.

Embodiments of the present invention are given below according to the FIG. 1. FIG. 1 is a sectional view of a contact key switch, showing an embodiment of the present invention.

In the FIG. 1, the main body 1 of the contact key switch has been made of non-operation portion 1*a*, operation portion 1*b*, thin skirt portion 1*c* connecting them, and a projecting portion 1*d*, projecting downward integrally with an elastic body. The surface of layered contact portion 2 is made of the electroconductive woven fabric or the electroconductive nonwoven fabric.

In one embodiment, silicon rubber was used for the main body 1 of the contact key switch. For a carbon fiber forming the electroconductive woven fabric or the electroconductive nonwoven fabric of the surface of the contact portion, Torekakurosu made by Toray K. K. was used in the electroconductive woven fabric and Torekamatto (made by Toray K. K.) was used in the electroconductive nonwoven fabric. Electroconductive silicon rubber was used in the rubber layer.

The rubber layer of layered electroconductive portion is not specially restricted if integrated hardening is possible by vulcanizing the main body of the contact switch and carbon fiber fabric. However, a rubber-like elastic body made of the same material as that of the main body of the contact switch is preferable. Silicon rubber containing 50 weight part of carbon black was used. The contact resistance of the layered contact portion was 2 to 3 Ù.

A method for manufacture of the layered contact portion of the present invention is described below for using the carbon fiber fabric according to the FIG. 2.

Figure 2:
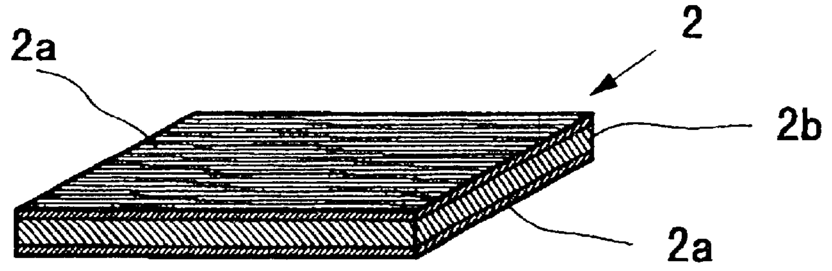
FIG. 2 is a perspective side view of the layered body made of a rubber and fiber fabric.
Figure 3:
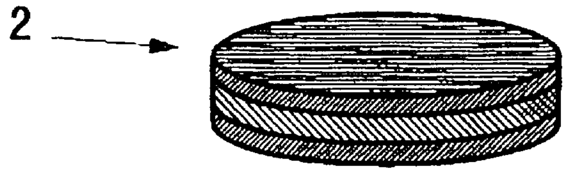
FIG. 3 is a perspective side view of the layered contact portion.
Figure 4:
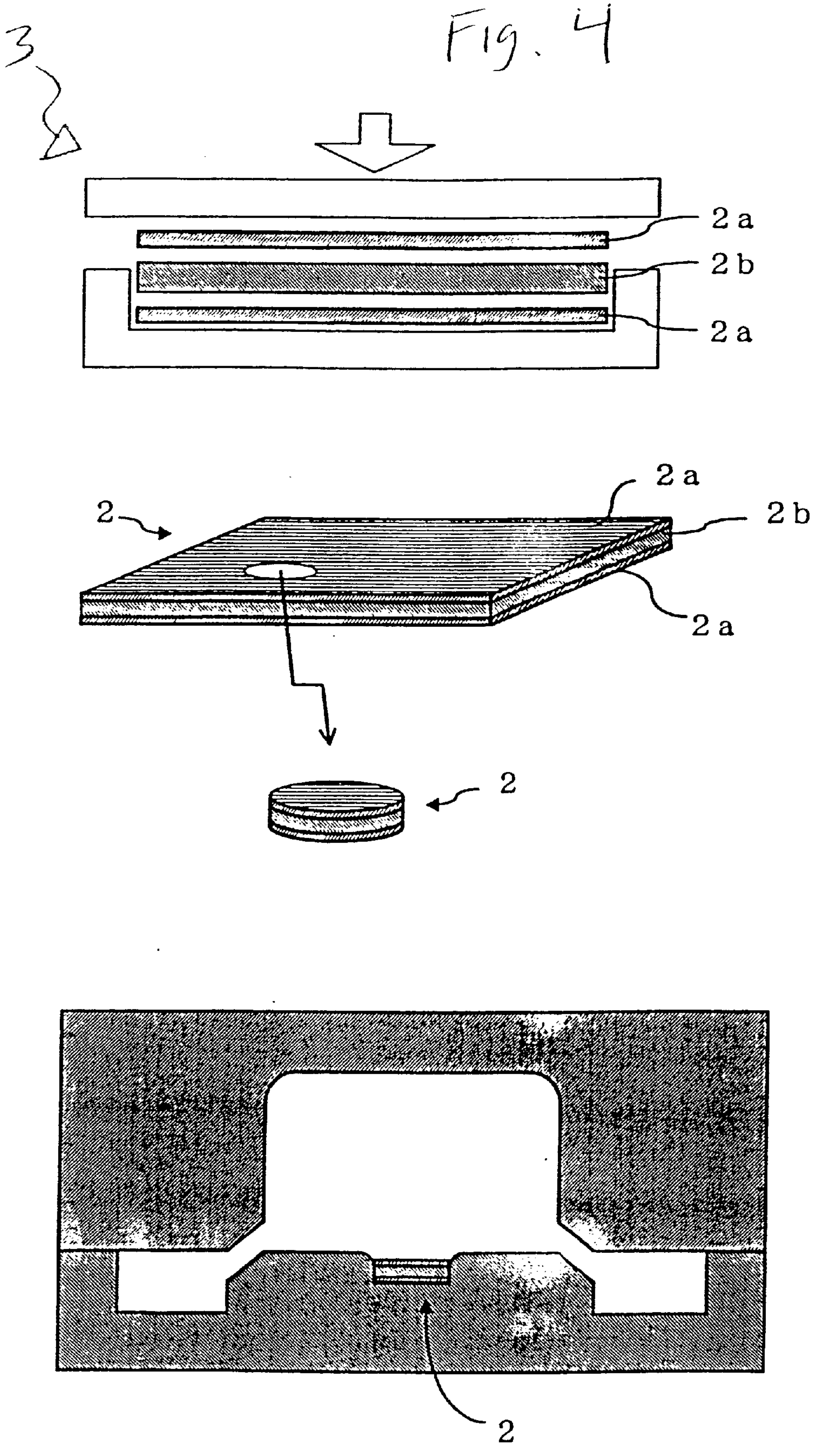
FIG. 4 is a view of a first set of method steps of the present invention.
Figure 5:
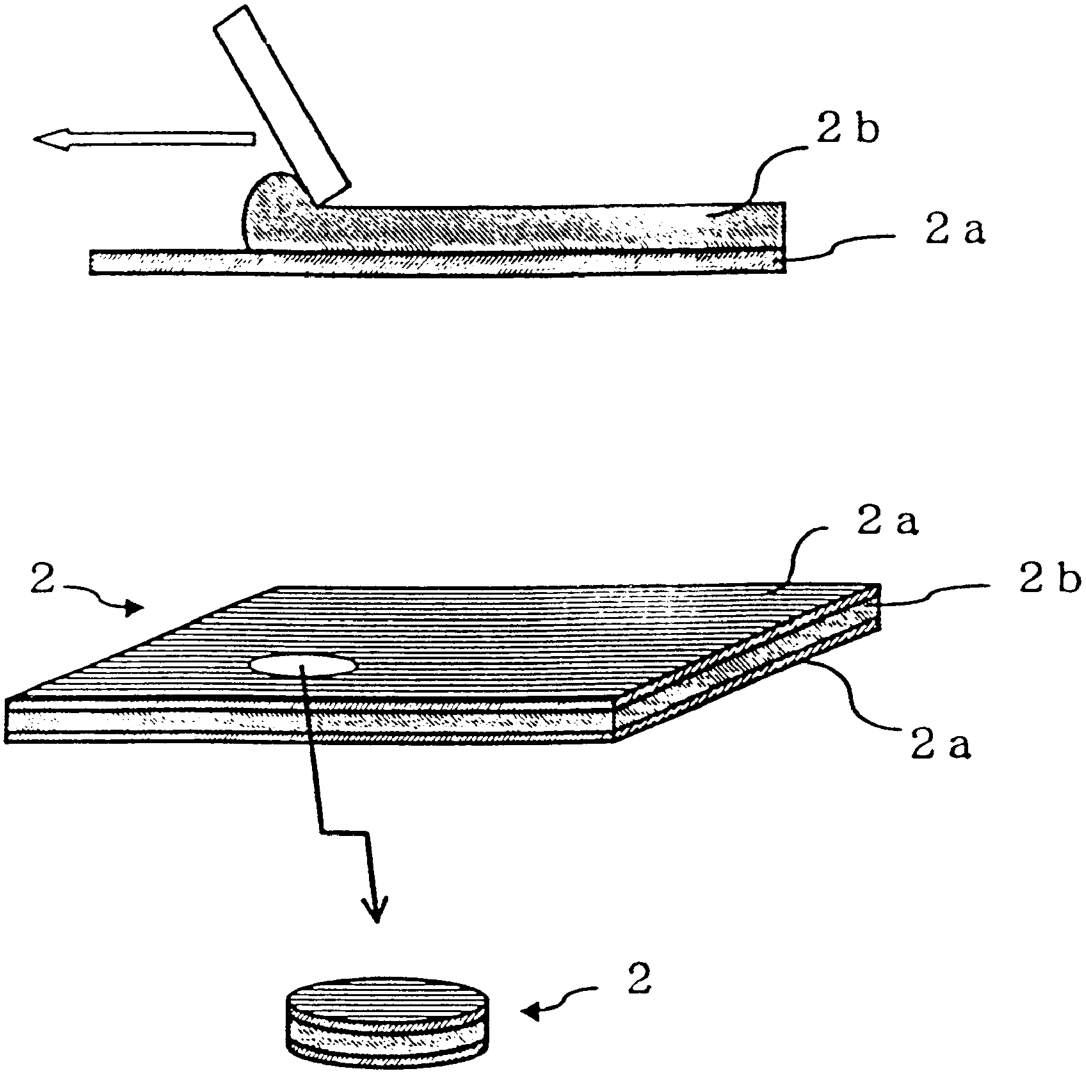
FIG. 5 is a view of a second set of method steps of the present invention.
Figure 6:
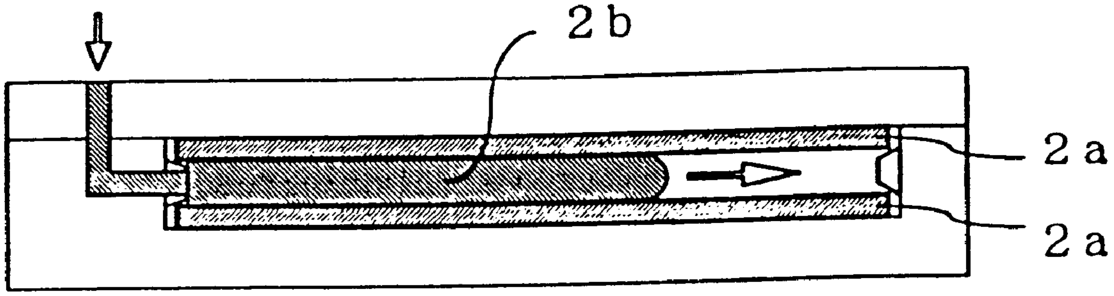
FIG. 6 is a view of a third set of method steps of the present invention
Figure 6:
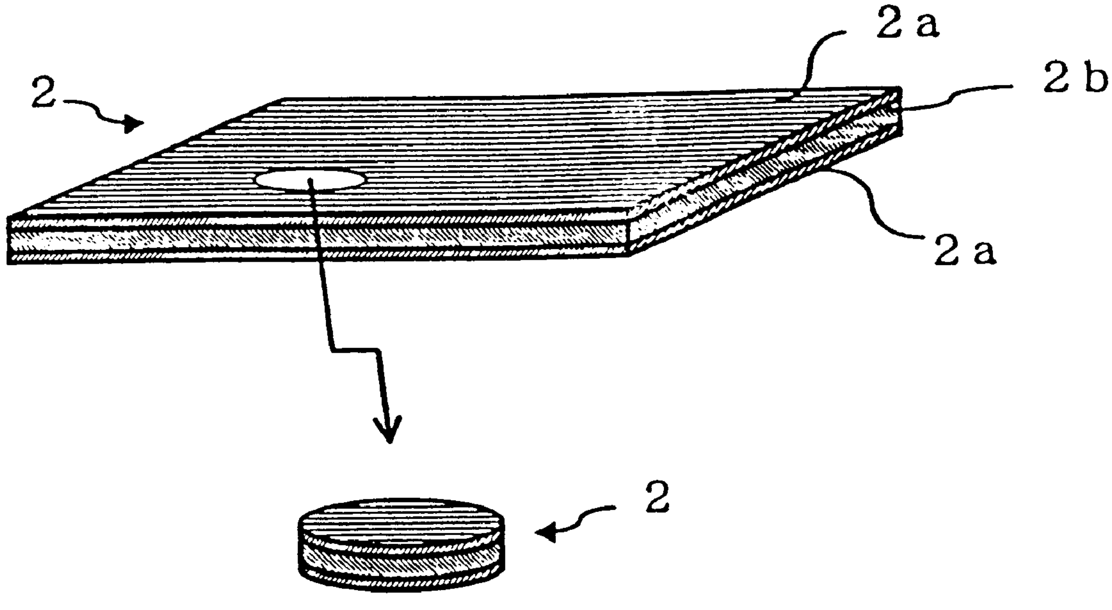

As shown in the FIG. 2, the layered body 2 made by layering a rubber sheet 2*b* on the carbon fiber fabric 2*a* and layering the carbon fiber fabric 2*a* on the rubber sheet 2*b* was subjected to compression molding under 190 $kgf/cm^2$ using unvulcanized electroconductive silicon rubber layer and the carbon fiber fabric (Torekakurosu made by Toray K.K.), vulcanized and integrated, punched in a given shape to manufacture the layered contact portion as shown in the FIG. 3. In the case of using the Torekamatto (made by Toray K. K.) as the carbon fiber nonwoven fabric for the layered contact portion, manufacture was carried out by same method as that of the carbon fiber fabric.

The contact key switch was manufactured by putting the layered contact portion in a mold and putting silicon rubber as a rubber-like elastic body of the main body 1 of the contact switch in the mold to mold integrally. The compression pressure at the compression molding is not restricted if the layered contact portion can be molded in a given thickness. However, Preferable pressure is 100 to 200 kg/cm$^2$ in either unvulcanized rubber of liquid form or solid form.

Table 1 presents the result of the electroconductive woven fabric in the layered contact portion made of carbon fibers. Similarly, Table 2 presents the result of the electroconductive nonwoven fabric.

As the result of evaluation of resistance (contact resistance), holding performance, molding performance, and processibility for release, the embodiments (e) and (k) were good in all the items. Other embodiments are presented as comparative embodiments in respective tables. The contact resistance is represented by OO for resistance less than 2 Ù, O for 2 to 10 Ù, and X for more than 10 Ù.

Holding performances are represented by O for a case of no problem in close contact of a rubber with fibers and X a case possible to fall down. The molding performances are represented by O for a case in which the shape of fibers have been kept after molding and X a case in which the shape of fibers have not been kept by moving of fibers after molding. The processibility was represented by O for a case in which a section is clearly punched by punching in a given shape after molding and X a case in which many burr have occurred by falling down of fibers pulled out by a blade.

TABLE 1

Electroconductive woven fabric

| | number of wale × (25 mn) | number of filament y | resistance | holding performance | molding performance | processibility |
|---|---|---|---|---|---|---|
| a | X < 10 | y < 1000 | x | ○ | x | ○ |
| b | " | 1000 ≦ y ≦ 6000 | x | ○ | x | ○ |
| c | " | 6000 × y | x | ○ | ○ | x |
| d | 10 ≦ X ≦ 30 | y < 1000 | ○ | ○ | x | ○ |
| e | " | 1000 ≦ y ≦ 6000 | ◎ | ○ | ○ | ○ |
| f | " | 6000 < y | ◎ | x | ○ | x |
| g | 30 < X | y < 1000 | ○ | x | ○ | ○ |
| h | " | 1000 ≦ y ≦ 6000 | ◎ | x | ○ | ○ |
| i | " | 6000 < y | ◎ | x | ○ | x |

TABLE 2

Electroconductive woven fabric

| | carbon mass rate z (g/m$^3$) | resistance | holding performance | molding performance | processibility |
|---|---|---|---|---|---|
| j | z < 30 | x | ○ | x | x |
| k | 30 ≦ z ≦ 1000 | ○ | ○ | ○ | ○ |
| l | 1000 ≦ z | ○ | x | ○ | ○ |

The contact key switch of the present invention has the surface of electroconductive contact portion made of woven fabric or nonwoven fabric of electroconductive fibers. Thus, the same low resistance was yielded as that of the contact portion made of a metal plate.

Further, manufacture of the layered contact portion by punching in a given shape the layered body, of which both surfaces of the rubber layer is covered by the electroconductive woven fabric or the electroconductive nonwoven fabric, gives electroconductivity to the both surfaces of the layered contact portion. Therefore, a jig or an apparatus or the like for identifying the side of the layered contact portion is not necessary for insertion of the layered contact portion in the contact part of the mold to allow efficient manufacture and a low cost.

The main body of the contact key switch and the electroconductive woven fabric or the electroconductive nonwoven fabric are easily and integrally molded by using same material to the rubber layer of the layered contact portion and the rubber-like elastic body of the main body of the contact switch. Thus, selection of an adhesive and adhesion process far use is not necessary.

Furthermore, the use of carbon fibers for the electroconductive woven fabric or the electroconductive nonwoven fabric prevents an increasing of resistance caused by oxidation which easily occurrs in a metal to provide the contact key switch of high reliability.

The carbon fibers are selected from a composition of number of wales of 10 to 30 per 25 mm and filament number of 1000 to 6000 in the electroconductive woven fabric and from carbon mass rate of 0.03 to 2.5 g per cm$^2$ in the electroconductive nonwoven fabric. By this, a high quality contact key switch has a low contact resistance and a high durability.

While specific embodiments of the invention have been shown and described in detail to illustrate the application of the principles of the invention, it will be understood that the invention may be embodied otherwise without departing from such principles.

What is claimed is:

1. A method for manufacture of a contact key switch, the method comprising the steps of:

providing a first layer of electroconductive woven fabric or electroconductive nonwoven fabric;

providing a second layer of electroconductive woven fabric or electroconductive nonwoven fabric;

penetrating an unvulcanized rubber into an opening portion of said first and second electroconductive woven fabric or electroconductive nonwoven fabric and hardening said rubber to form a layered body;

punching the layered body in a given shape to make a layered contact portion and to form it as a part of a key pad made of a rubber elastic body so as to make the electroconductive woven fabric or the electroconductive nonwoven fabric as a surface.

2. A method for manufacture of a contact key switch according to claim 1, wherein penetration of an unvulcanized rubber in the opening portion of an electroconductive woven fabric or an electroconductive nonwoven fabric is carried out in compression molding.

3. A method for manufacture of a contact key switch according to claim 1, wherein an unvulcanized rubber penetrates in the opening portion of the electroconductive woven fabric or the electroconductive nonwoven fabric through applying or printing by using a roll or a blade, and is hardened in a hardening furnace to make a layered body.

4. A method for manufacture of a contact key switch according to claim 1, wherein said rubber elastic body is made of silicon rubber.

5. A method for manufacture of a contact key switch, the method comprising the steps of:

placing a first layer of electroconductive woven fabric or electroconductive nonwoven fabric in a mold;

placing a second layer of electroconductive woven fabric or electroconductive nonwoven fabric in the mold;

injecting a thermoplastic elastomer into the mold between, and deposited on, said first and second electroconductive woven fabric or said electroconductive nonwoven fabric to penetrate into an opening portion thereof to make a layered body;

punching the layered body in a given shape to make a layered contact portion;

forming a part of a key pad made of a rubber elastic body to have the electroconductive woven fabric or the electroconductive nonwoven fabric as a surface of the keypad.

6. A method for manufacture of a contact key switch according to claim 1, wherein the electroconductive woven fabric or the electroconductive nonwoven fabric is selected from a carbon fiber.

7. A method for manufacture of a contact key switch according to claim 6, wherein the carbon fiber is made of the composition of the number of wales of 10 to 30/25 mm and filament number of 1000 to 6000 in the electroconductive woven fabric and of carbon mass rate of 0.03 to 2.5 g/cm$^3$ in the electroconductive nonwoven fabric.

8. A method for manufacture of a contact key switch according to claim 2, wherein said rubber elastic body is made of silicon rubber.

9. A method for manufacture of a contact key switch according to claim 3, wherein said rubber elastic body is made of silicon rubber.

10. A method for manufacture of a contact key switch according to claim 6, wherein the electroconductive woven fabric or the electroconductive nonwoven fabric includes carbon fiber.

11. A method for manufacture of a contact key switch according to claim 3, wherein the electroconductive woven fabric or the electroconductive nonwoven fabric includes carbon fiber.

12. A method for manufacture of a contact key switch according to claim 4, wherein the electroconductive woven fabric or the electroconductive nonwoven fabric includes carbon fiber.

13. A method for manufacture of a contact key switch according to claim 5, wherein the electroconductive woven fabric or the electroconductive nonwoven fabric includes carbon fiber.

14. A method for forming a contact key switch, the method comprising:

providing two conductive layers;

molding said two conductive layers together on opposite sides of an elastic layer to form a contact sheet;

removing a contact portion from said contact sheet;

molding said contact portion with a main body to form the contact key switch.

15. A method according to claim 14, wherein:

said two conductive layers are one of an electroconductive woven fabric and an electroconductive nonwoven fabric;

said elastic layer is an unvulcanized rubber;

said molding includes penetration of said unvulcanized rubber in an opening portion of said electro conductive woven fabric or said electro conductive nonwoven fabric and is carried out in compression molding.

16. A method according to claim 14, wherein:

said two conductive layers are one of an electroconductive woven fabric and an electroconductive nonwoven fabric;

said elastic layer is an unvulcanized rubber;

said molding includes penetration of said unvulcanized rubber in an opening portion of said electroconductive woven fabric or said electroconductive nonwoven fabric by applying or printing using a roll or a blade, and is hardened in a hardening furnace to make a layered body.

17. A method according to claim 14, wherein:

said rubber elastic body is made of silicon rubber.

18. A method according to claim 14, wherein:

the electroconductive woven fabric or the electroconductive nonwoven fabric is selected from a carbon fiber.

19. A method according to claim 18, wherein:

the carbon fiber is made of the composition of the number of wales of 10 to 30/25 mm and filament number of 1000 to 6000 in the electroconductive woven fabric and of carbon mass rate of 0.03 to 2.5 g/cm$^3$ in the electroconductive nonwoven fabric.

20. The method in accordance with claim 14, wherein: said elastic layer is conductive.

* * * * *